(12) United States Patent
Rothschild

(10) Patent No.: US 7,257,582 B2
(45) Date of Patent: Aug. 14, 2007

(54) LOAD BALANCING WITH SHARED DATA

(75) Inventor: Michael Rothschild, Ramot Hashavim (IL)

(73) Assignee: Corigin Ltd, Or-Yehuda (IL)

( * ) Notice: Subject to any disclaimer, the term of this patent is extended or adjusted under 35 U.S.C. 154(b) by 912 days.

(21) Appl. No.: 10/375,893

(22) Filed: Feb. 27, 2003

(65) Prior Publication Data

US 2003/0177161 A1     Sep. 18, 2003

Related U.S. Application Data

(60) Provisional application No. 60/363,853, filed on Mar. 13, 2002.

(51) Int. Cl.
*G06F 17/30* (2006.01)

(52) U.S. Cl. ..................... 707/10; 707/104.1

(58) Field of Classification Search ............. 707/1–10, 707/100–104.1, 200–206; 718/105; 719/316; 703/23; 705/35; 711/147.3, 133
See application file for complete search history.

(56) References Cited

U.S. PATENT DOCUMENTS

| | | | | | |
|---|---|---|---|---|---|
| 5,357,632 | A | * | 10/1994 | Pian et al. | 718/105 |
| 5,603,028 | A | * | 2/1997 | Kitsuregawa et al. | 718/105 |
| 5,835,755 | A | * | 11/1998 | Stellwagen, Jr. | 707/3 |
| 5,926,833 | A | * | 7/1999 | Rasoulian et al. | 711/147 |
| 6,061,067 | A | * | 5/2000 | Silva et al. | 345/619 |
| 6,275,867 | B1 | * | 8/2001 | Bendert et al. | 719/316 |

* cited by examiner

*Primary Examiner*—Yicun Wu
(74) *Attorney, Agent, or Firm*—Andrew Wilford

(57) ABSTRACT

The input of a computer executable process, is logically subdivided, without reading, into a plurality of partitions which are distributed to a plurality of processors in which respective subtasks including the reading of those partitions, are carried out. The method allows distribution of processing of a large amount of data to a plurality of processors cooperating in a way that the load imposed on each processor is proportional to its capacity to do the work.

14 Claims, 4 Drawing Sheets

LOAD BALANCING WITH SHARED DATA

CROSS REFERENCE TO RELATED APPLICATIONS

This application is a nonprovisional application corresponding to Ser. No. 60/363,853 filed 13 Mar. 2002.

FIELD OF THE INVENTION

This invention relates to the field of sharing data and workload between possibly heterogeneous computer systems.

More specifically, it deals with a way to split the performance of a given task among a plurality of processing units which can all access, directly or indirectly, the input data and the devices on which the output data is to be stored.

Sort applications, statistical analysis batch applications and report writing applications and database queries are examples of applications that can readily enjoy this invention.

BACKGROUND OF THE INVENTION

With the constant improvement in telecommunication technology and the increasing tendency to consolidate computing resources, many computer sites contain a plurality of computers.

The load imposed on the various computers in these sites is normally the result of the activities directed specifically to these computers and the fact that one of them is especially loaded while others are relatively idle does not affect the way work is distributed between them. As a result, in contemporary environments, much can be gained by the parallelization of some processes and their distributed execution across all available computing resources in a way that both speeds the execution of the whole process and balances the load the various computers are subjected to.

Recent developments introduced the concepts of Storage Area Networks (SAN) and Network Attached Storage (NAS) devices to enable efficient usage of storage resources. These technologies increase the symmetry of storage access in a multiple computer environment, increasing the benefits that can be expected from such a parallelization.

OBJECTS OF THE INVENTION

The principal object of the present invention is to enable the decomposition of a certain type of linear processes that currently use a single computer, into equivalent parallel processes that can efficiently use any number of potentially heterogeneous computers, taking the available capacity of each of these computers into account while optimizing execution.

A more general object is to improve processing efficiency of certain processes.

It is also an object to obtain better processor utilization.

SUMMARY OF THE INVENTION

These objects and others which may become apparent hereinafter are achieved in a method which distributes the load of a process that normally reads an input file sequentially and processes its records one by one between a plurality of potentially heterogeneous processors through the logical partition of the input and the activation of a plurality of sub tasks in said plurality of processors, each said sub task processing the partitions defined by said logical partition in a first come first serve basis.

The method of effecting a computer-executable process according to the invention thus comprises the steps of:

(a) automatically determining file allocation and logically subdividing records of the input file into a plurality of partitions;

(b) distributing the partitions to a plurality of processors and activating respective subtasks of the computer-executable process in each of the processors, each subtask reading and processing the partitions on a first come first serve basis; and (c) generating at least one output reflecting the processing of the subtasks.

The automatic determination of file allocation and logical subdivision of records of said input file into said plurality of partitions in step (a) and the distribution of said partitions in step (b) can be carried out with at least one processor and the processors used can include mutually heterogeneous processors.

Each of the subtasks can produce a subtask output and the subtask outputs can be merged to produce the output of step (c). The output in step (c) can, however, be a succession of outputs from the subtasks in a one to one correspondence with the records of the input file. Alternatively, the output in step (c) can be an accumulation of output records from the subtasks in an arbitrary order.

The input file can reside on a directly attached storage or on a storage area network (SAN) or on a network attached storage (NAS) and can be derived therefrom. The computer-executable process can be a sort process, a statistical analysis process, a report creating process or a database query or a combination thereof. Without limitation thereto, the one processor can be part of a mainframe computer and the plurality of processors can be processors of at least one other computer or the plurality of processors can all be parts of a single multiprocessor. The one processor can thus also reside on a machine which is not a mainframe.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
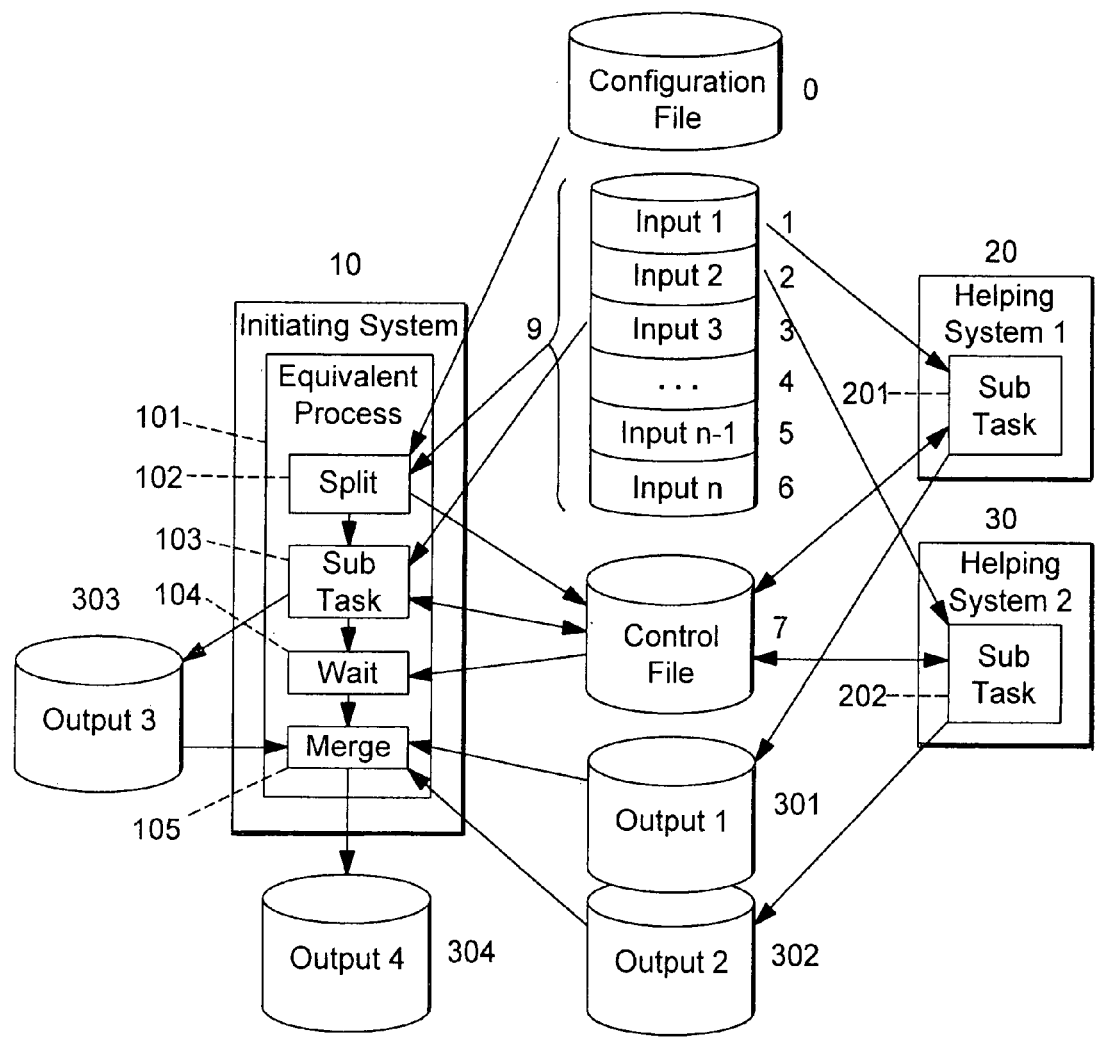
FIG. 1 is a block diagram describing how a system according to the invention works.

FIG. 1 contains a top-level description of the invention and its workings. In the initiating system 10, the invocation of a process has been replaced by an invocation of a logically equivalent Process 101 that is based on the current invention, capable of delegating at least some of the load to the available helping systems. In this figure, only two such helping systems are depicted—helping system 1 and helping system 2—but in general, any positive number of such systems can be used.

The Equivalent Process 101 accepts the same input, or input with the same semantics, as the original Process. If the original Process is a sort Process then, in most cases, it is told by this input, what the file to be sorted is and what parts of the records in this file constitute the key according to which it is to be sorted. In this case the input also specifies the data types of the various parts of the key. If the original Process is one of statistical analysis then the various statistics and the data for these statistics are specified by this input. If the original Process is a report generator then the definition of the various reports and the data files they should be extracted from are parts of this input.

The various parts of the Equivalent Process 101 are depicted here as consecutive steps in one procedure but alternative embodiments could replace them by dependent tasks controlled by a job scheduler. In this case, the wait step 104 would be replaced by a dependency of the Merge step 105 on the completion of Sub Task 103, Sub Task 201 and Sub Task 202. More generally, the Merge step would have been instructed to start only after all the Sub Task steps have completed.

The first step of the Equivalent Process 101 is the Split step 102. This step combines the information contained in the parameters supplied to the Equivalent Process 101 as a whole (in the sort case, these parameters include the name of the file to be sorted 9 and the keys to be used), with the information contained in the configuration file 0 which includes the names of the servers available to perform this task and with information from the operating system about the size and location of the input file or files 9, to create the control file 4 specifying a logical partition of the input.

Input files 9 are, thus, logically partitioned into n logical partitions where n is a number the split step 102 has decided upon. In FIG. 1, these logical partitions are numbered as 1 to 6.

A logical partition in this context is a well-defined part of the input or output. A very simple way to define a partition, which in many cases is the most efficient, would be to define the partitions as consecutive ranges on the input or output, ranging from one relative byte address to another relative byte address or from one relative track address to another.

Of course, as we normally process full records, the partition boundaries or the way they are interpreted should take this fact into account. For example, if the beginning of a range falls within a record, this record can be said to belong to the previous range. Other partition definitions can be used with no impact on the rest of the embodiment.

Note that the number of input partitions is not necessarily the number of helping systems. Normally, the number of logical input partitions will largely exceed the number of helping systems.

Note that the logical partition does not rely on actual reading of the file. The actual reading of the file is reserved to the subtasks which read the partitions allocated to them. A splitting function may be allocating offset 0 to offset 100000 to a first partition, offset 100001 to 200000 to the second partition, offset 200001 to 300000 to the third partition and 300001 to the end of the file to a fourth partition.

The split step 102 could rely on additional information that could also be contained in the configuration file 0. It could, for example, take into account the power of each available server and the current load of this server.

When the split step terminates, the various Sub Tasks (in this case: 103, 202,203) can be activated. This activation can be initiated by the split step 102 itself or by an external scheduler. Each Sub Task finds the subdivision of the input in the control file 4. Each such Sub Task then repeatedly tries to allocate for itself and then process, an input partition that has not been allocated yet. In the embodiment described in FIG. 1, the output of the various Sub Tasks has to be further processed to create an output that is equivalent to the one expected from the original process. This is why each Sub Task creates its output on dedicated output files. In this case, Sub Task 201 creates Output1 (301), Sub Task 202 creates Output2 (302) and Sub Task 103 creates Output3 (303).

Reading, processing and writing, are not necessarily straight forward since all the input and output files are shared by the potentially heterogeneous systems and while the Sub Task itself is also performed in these potentially heterogeneous systems, the results should look as if they have all been created by the Initiating System 10.

This is why the various Sub Tasks may have to use heterogeneous read and write functionality to read and write their corresponding Input Partitions (see my commonly owned copending application Ser. No. 10/209,673 filed 31 Jul. 2002, which is hereby incorporated in its entirety by reference).

This is also why, if the original Process is a sort Process, depending on the type of the input key, parts of the key's data may or may not be converted from the Initiating System's representation to an equivalent representation on the Helping Systems and then, after being sorted, converted back to the Initiating System's representation.

If, continuing with the sort example, the Initiating System 10 is an IBM mainframe and the Helping Systems 20 and 30 are HP-UX machines then character strings should not be converted from EBCDIC to ASCII since the order we want to create is the EBCDIC order. In this case, binary numbers should not be converted either since their representation is the same on both systems but the mainframe's floating point numbers should be, converted to HP-UX floating point numbers and back and packed decimal numbers should be converted to and from some HP-UX appropriate representation like, depending on the precision, short, long or long long binary numbers or even character strings.

Once all the Sub Tasks have terminated, the Merge Step 105 can be initiated. To initiate the Merge Step 105 at the appropriate time, the Wait Step 104 can be used, as depicted in this figure, to periodically verify the Control file 4 and detect the completion of all sub tasks and then schedule the Merge Step 105. Another alternative for the timely activation of the Merge Step would be to use some existing scheduler, as already mentioned.

Note that although the Merge Step 105 is depicted as running on the Initiating System 10, this should not necessarily be the case.

It can be the task of the Split Step 102 to decide where the Merge Step 105 should run or the processor that was the fastest in processing the last input partition it processed can be automatically selected for this purpose.

The Merge Step 105, as the Sub Tasks preceding it, may have to use the heterogeneous read and write functionality and the appropriate type conversions of parts of the data. What the Merge step 105 does is, of course, to merge the outputs of the various Sub Tasks into the result output file or files, represented in this figure by Output 4. Once the Merge Step 105 has completed, the whole Equivalent Process 101 is complete. The Merge step 105 only needs to be performed in cases where there are more than one Sub Task. Otherwise it is not needed.

If the original Process is a sort Process then there are some additional cases, beyond the simple sort of an input file for the creation of an output file where the same technology)can be used to at least some extent.

A typical case is when the sort to be replaced uses exits like the input and output exits supported by all conventional IBM mainframe sort utilities, termed, in this environment E15 and E35.

Such exits could be handled in any of the following ways or a combination thereof:

Provide equivalent exit routines in all the relevant Helping System. This requires some work and is not always possible but when implemented, it is the most efficient solution. Note that the input exit only needs to be implemented where Sub Tasks are performing and the output exit only needs to be implemented where the Merge Process or the only Sub Task is being performed.

Use communication, either over telecommunication lines, or through the disk controller, to communicate between an exit running on one system and a Sub Task or Merge Process running on another. This alternative is not as efficient as the other ones, but it could be the only available one.

Run the Merge Process on the Initiating System 10 just to avoid the need to perform the output exit elsewhere.

Run on the initiating System 10 Pre Sort and Post Sort conversion steps with the sole purpose of running the exits.

Figure 2:
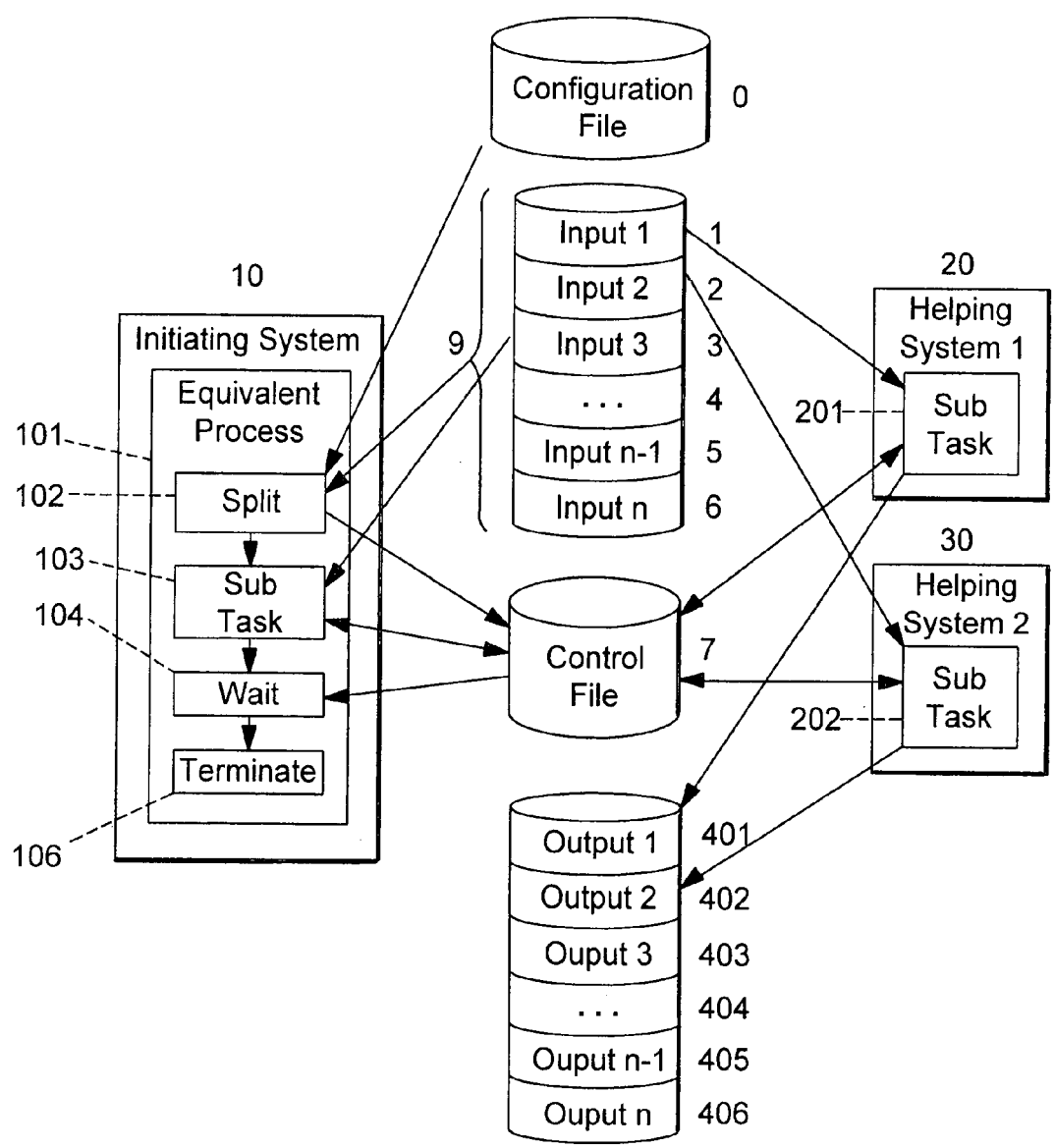
FIG. 2 is a block diagram which describes the way the system works when the output file can be shared with no write coordination mechanism.

FIG. 2 depicts an embodiment that can improve performance in some very special cases.

The special cases where this embodiment would be preferable are those where there is a one to one correspondence between the input records and the output records, the size of the output generated for a given input partition can be predicted and there is no harm in placing the output records in the same order as their corresponding input records appeared in the input file.

In such cases, output partitions are logically allocated on an output file in a one to one correspondence with the input partitions and the Sub Tasks write the output resulting from processing a specific input partition to the corresponding output partition. The Merge step can then be obviated.

In the specific example of FIG. 2, the output created from processing input1 1 is placed in output1 401, the output created for input2 2 is placed on output2 402 etc.

The Terminate step 106 is only there to signal the termination of the equivalent processes. In an environment where process scheduling is performed by a scheduler, this step can be obviated.

In this embodiment, as well as in that of FIG. 1, there is a simple way to reduce the risk of failure resulting from one of the systems becoming inoperative.

All that is needed is some mechanism to detect the failure of a system (based, for example, on some heart beat mechanism) and return the partitions for which the failing system was responsible to the general pool where the remaining systems will then take care of them.

Figure 3:
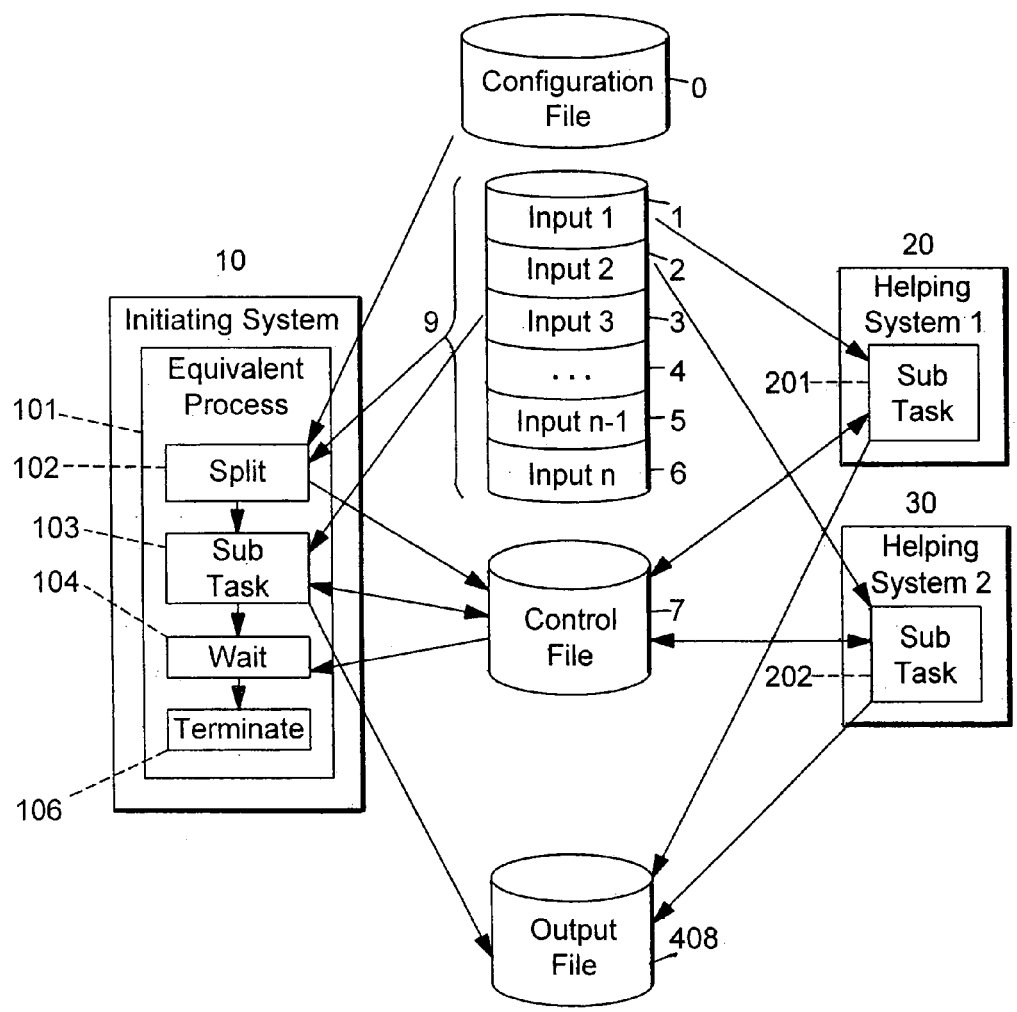
FIG. 3 is a block diagram which describes the way the system works when the output file can be shared with a write coordination mechanism.

FIG. 3 depicts yet another special embodiment that is preferable in applications where the output created by the various Sub Tasks is small when compared to their input, where the order of the resulting records is immaterial and where a mechanism exists for simultaneous writes on a single file.

Note that in the embodiment of FIG. 2 there where simultaneous write operations directed at the same file as well but since the various parts of the output file were preallocated and no two Sub Tasks wrote to the same logical partition of the output, there was no need for a special mechanism to coordinate these simultaneous writes. This is not the case in this figure. Here, the output records are written to the output file 408 at an arbitrary order and there is no prior knowledge of their quantity and size. Therefore, the write operations must be coordinated and it is the assumption of this embodiment that they are.

A special case where such an embodiment might be interesting is that of a query that selects rows from a database table without requiring any special ordering of the output. In this case, there might be a process that first scans the index to detect interesting row identifiers and puts them on the input file 9 that serves as an input for the whole process depicted in this figure. Both this input file 9 and the output file 408 can be virtual. The input file may be a memory resident list and the output file may be the screen of a terminal.

Figure 4:
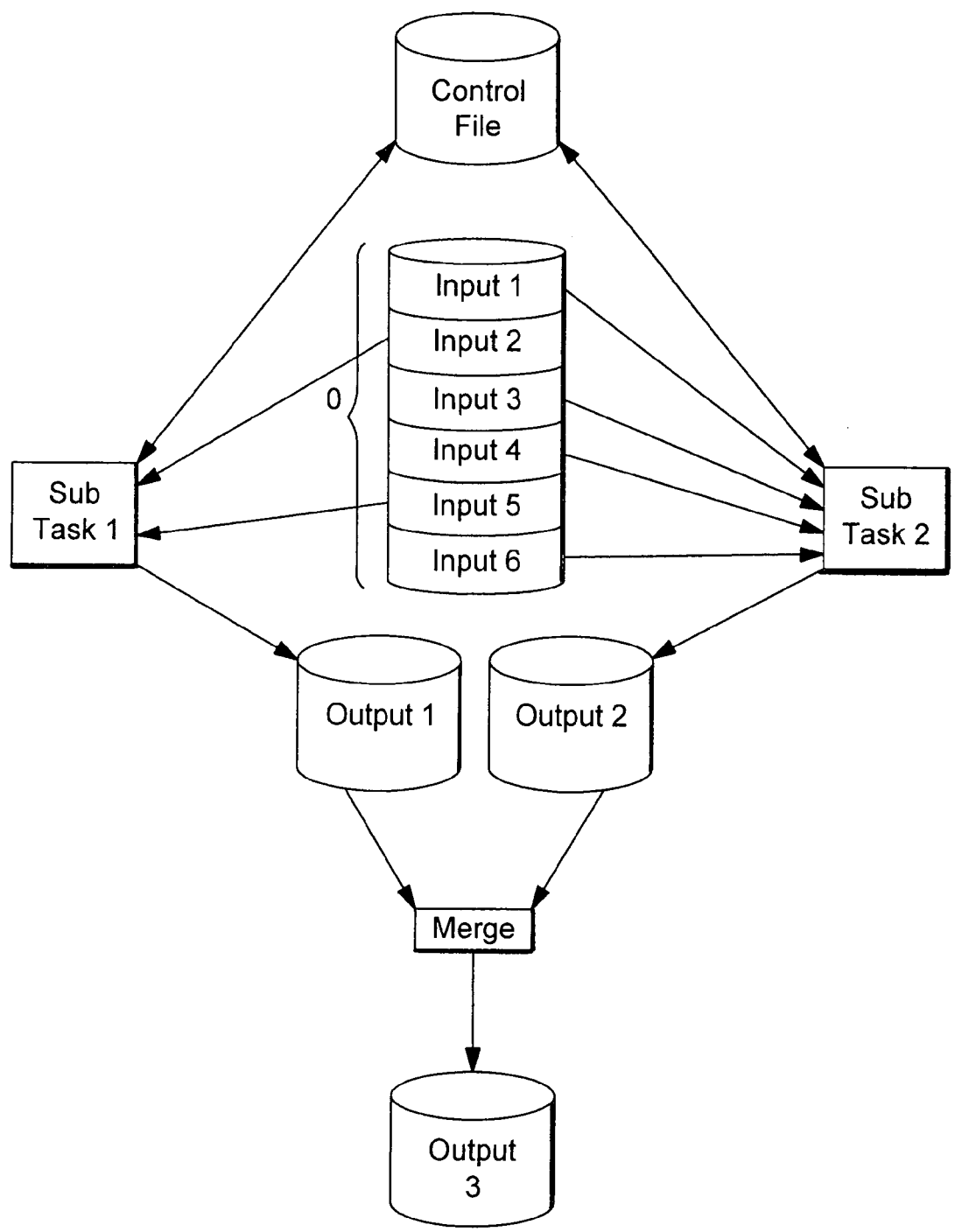
FIG. 4 is a diagram which illustrates the application of the invention to a sort process.

FIG. 4 describes a sort process. In the example depicted in FIG. 4, two subtasks—Sub Task 1 and Sub Task 2, are invoked to perform a sort.

The input file 0 is (logically) partitioned into six partitions.

Sub Task 2 is, for some reason, faster than Sub Task 1 (it may be running on a faster processor or on one on which the current load is lower). This is why Sub Task 2 manages to do a larger part of the job.

First, Sub Task 2 updates the control file to take responsibility of Input 1.

Then Sub Task 1 starts processing Input 1. While this is happening, Sub Task 2 takes responsibility (using the control file) for Input 2 and starts processing it.

While Sub Task 1 processes Input 2, Sub Task 2 finishes the processing of Input 1, takes responsibility for Input 3 and processes it, then it takes responsibility for Input 4 and starts processing it.

While Sub Task 2 processes Input 4, Sub Task 1 finishes processing Input 2, takes responsibility for Input 5 and starts processing it.

While Sub Task 1 processes Input 5, Sub Task 2 finishes processing Input 4, takes responsibility for Input 6, and processes it.

When both Sub Tasks terminate the processing of their last input partition they put the sorted output on their respective output files.

Then the merge step is initiated and merges the two output files into one merged output file.

I claim:

1. A method of effecting on a preexisting input file a computer-executable process comprised of a plurality of subtasks, the method comprising the steps of:
    (a) automatically determining file allocation and logically subdividing records of said input file into a plurality of partitions;
    (b) distributing descriptions of all of said partitions to each of a plurality of subtask processors
    c) simultaneously executing at least a respective one of the subtasks of the computer-executable process in each of at least some of said processors on a respective one of the partitions with each subtask reading and processing the respective partition so as to process the respective partition and produce respective subtask output and;
    d) thereafter repeating step (c) in at least some of the subtask processors each with another unprocessed partition on a first-come/first-served basis; and
    (e) generating at least one output combining all of the subtask outputs and reflecting the processing of all of said subtasks.

2. The method defined in claim 1 wherein the automatic determination of file allocation and logical subdivision of records of said input file into said plurality of partitions in step (a) and the distribution of the description of all of said partitions in step (b) is carried out with at least one further processor in addition to the subtask processors.

3. The method defined in claim 1, further comprising the step of merging said subtask outputs in step (e).

4. The method defined in claim 1 wherein the output in step (e) is a succession of outputs from said subtasks in a one-to-one correspondence with said records of said input file.

5. The method defined in claim 1 wherein the output in step (e) is an accumulation of output records from said subtasks in an arbitrary order.

6. The method defined in claim 1 wherein said input file resides on a storage area network and is derived therefrom.

7. The method defined in claim 1 wherein said input file resides on a network-attached storage and is derived therefrom.

8. The method defined in claim 1 wherein said computer-executable process is a sort process.

9. The method defined in claim 1 wherein said computer-executable process is a statistical analysis process.

10. The method defined in claim 1 wherein said computer-executable process is a report-creating process.

11. The method defined in claim 1 wherein said computer-executable process includes a database query.

12. The method defined in claim 2 wherein said one processor is part of a mainframe computer and the other processors are processors of at least one other computer.

13. The method defined in claim 1 wherein said plurality of processors are all parts of a single multiprocessor.

14. The method defined in claim 1 wherein the automatic determination of file allocation and logical subdivision of records of said input file into said plurality of partitions in step (a) and the distribution of the descriptions of all of said partitions in step (b) is carried out with at least one processor, and said one processor and said plurality of processors are all parts of a single multiprocessor not including said one processor.

* * * * *